Nov. 12, 1946.  W. A. BLUME ET AL  2,410,924

FRICTION ELEMENT

Filed Aug. 26, 1944

Inventors:
William A. Blume
Edward Wm. Conarton
By Wallace & Cannon
Attorneys

Patented Nov. 12, 1946

2,410,924

UNITED STATES PATENT OFFICE 2,410,924

FRICTION ELEMENT

William A. Blume, Bloomfield Hills, Mich., and Edward W. Conarton, Jersey City, N. J., assignors to American Brake Shoe Company, New York, N. Y., a corporation of Delaware Application August 26, 1944, Serial No. 551,284

9 Claims. (Cl. 188—251)

This invention relates to friction elements and more particularly to composition friction elements of the type which embody a reenforcement, such as wire backing, and of which those employed in automotive brakes, clutches and the like are exemplary.

Composition friction elements such as those with which our invention is primarily concerned, are customarily compounded from a mixture of fibrous material such as asbestos or the like, ingredients which affect the frictional properties of the element, and a bond. Such friction elements are usually of strip form and are often supplied in the form of continuous strips that are wound into coils that are divided to afford elements of the desired length and the elements therefore embody sufficient flexibility to enable such coiling of a strip arrangement thereof and also to enable them to be conformed to the configuration of the supports on which they are mounted in use.

It is customary to include, in such friction elements, a metallic backing such, for example, as a wire mesh screen, which reenforces the friction elements and imparts thereto the strength required to effectively withstand the stresses to which the elements are subjected during the installation and use thereof. A reenforcement of this character should, however, be sufficiently flexible as to enable the elements to be wound into a coil, as aforesaid, and to enable such elements to be conformed to the supports therefor. Hence, it is an object of our invention to provide a composition friction element embodying a novel metallic reenforcing member which will impart sufficient strength to the element to withstand the stresses to which it will be subjected in use but which will be, nevertheless, sufficiently flexible to enable the element to be fitted onto the support adapted to receive the same and for other purposes.

One manner in which friction elements of the character to which this invention primarily relates may be produced is to thoroughly intermix ingredients such as, for example, the fibrous material, the friction-affecting ingredients, and the bond, and to then introduce the intermixed ingredients into the hopper of a rolling machine, such as, for example, that to which Smith Patent No. 1,920,023, patented July 25, 1933, pertains. In such a machine the composition material is fed from the hopper to the bite of a pair of forming rollers and onto a web of wire mesh or the like which is also fed between the rollers. In passing between the forming rollers the composition material is pressed into the desired shape and into the interstices of the wire mesh in such a way that the wire mesh affords a backing for the composition material. The wire mesh and the composition material compressed thereon and adhering thereto are fed from the forming rollers in the form of a continuous strip of material which may either be rolled into a coil of desired length or the continuous strip may be severed into relatively short strips. Thereafter, these strips of material are usually placed on suitable trays and are passed through an oven to be cured to a finished state.

In the rolling operation that is effected as aforesaid, the wire mesh backing is subjected to severe stresses and it must, therefore, possess sufficient innate strength to withstand such stresses and yet such backing must be sufficiently flexible as to enable the friction element to be rolled into coils or otherwise formed after passing through the forming rollers. Therefore, it is another object of our invention to afford a wire mesh backing member which has sufficient innate strength to enable it to effectively withstand a rolling operation of the aforesaid character but which also has sufficient flexibility to enable friction elements in which it is included to be rolled into coils or to be otherwise handled in the course of manufacture and use of the elements.

Heretofore, wire mesh screen having the wires thereof coated or galvanized with zinc has been used as the reenforcing medium in composition friction elements of the aforesaid character. However, it has been found that during the rolling of the wire and the composition material through the forming rollers of the rolling machine, when zinc coated wire mesh is used, bits of spelter from the backing may sometimes become intermixed with the composition material of the friction elements and it has been observed that as the frictional elements wear away in the use thereof, these bits of spelter may be exposed on the wearing face of the elements and, because of the hard crystalline structure of the zinc, these bits of spelter may score or otherwise damage the brake drums or the like against which the friction elements operate. Therefore, it is a further object of our invention to provide a friction element from which such undesirable spelter or like foreign material is eliminated whereby scoring or otherwise damage to brake drums and the like may be avoided.

Furthermore, in the event in the course of use of a friction element it may be that the composition material may be so worn away that the wire backing becomes exposed and in such instances, where zinc coated wire backing is used, because of the inherent characteristic of crystalline structure of the zinc, the likelihood that the brake drum or the like, against which the friction element operates, may be scored or otherwise damaged is increased. Hence, it is another object of our invention to avoid such scoring of a brake drum or the like under such conditions, by coating the backing with a metal which will not tend to score a brake drum or like member with which the element may be used.

In addition, it is well known that zinc is relatively brittle and inflexible and hence when it is used to coat wires it is relatively easily cracked upon flexing of the wires so that the wire becomes exposed. Such cracking of the coating and exposing of the wire will, of course, defeat the purpose for which the coating is used and, therefore, when zinc is used as a coating, the wire mesh screen must be handled with considerable care to prevent this from occurring. Hence, when zinc or like materials are used for coating the wire backing of friction elements the freedom of handling and of forming the wire backing is substantially curtailed, and this is especially true when employing lighter gauge zinc coated iron wire. It is, therefore, another object of our invention to provide a friction element embodying a wire mesh backing which is coated with a material which is more flexible than zinc or the usual zinc galvanizing material and which is particularly adapted for use in coating relatively lighter gauge iron wire.

A further object of our invention is to provide a friction element embodying a wire backing, and particularly a wire backing composed of relatively lighter gauge iron wire, which is coated with a lead-antimony alloy for so to do enables the foregoing and kindred objects of this invention to be realized.

Other and further objects of the present invention will be apparent from the following descriptions and claims and will be understood by reference to the accompanying drawing which, by way of illustration, shows a prefered embodiment and the principle thereof and what we now consider to be the best mode in which we have contemplated aplying that principle. Other embodiments of the invention embodying the same or equivalent principle may be used and structural changes may be made as desired by those skilled in the art without departing from the present invention and the purview of the appended claims.

Figure 1:
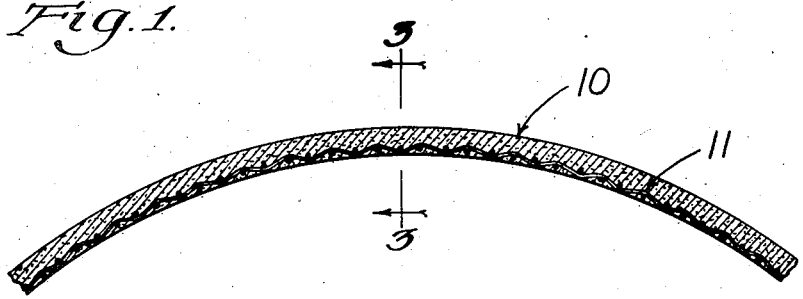
Fig. 1 is a longitudinal sectional view of a portion of a friction element embodying our invention.

Referring to the accompanying drawing, the friction element shown therein, and which embodies our invention, comprises a composition body 10 and a wire backing or reenforcing member 11 which may well be composed, for example, of a mesh or relatively soft, flexible iron wire of relatively light gauge such, for example, as 20 gauge.

In the manufacture of friction elements of the character shown in the drawing a wire mesh, having relatively large interstices between the wires 12 thereof, is combined with and acts as a reenforcing member for a composition body 10, as will be presently explained. In the manufacture of friction elements in accordance with our invention, the wires 12 of the reenforcing member 11 preferably consist, as pointed out hereinbefore, of a relatively soft but tough iron wire 13 having its surface completely covered with a lead-antimony alloy surface coating 14 to which reference will be made hereinafter.

In manufacturing friction elements of the aforesaid character, the composition body 10 is usually compounded of a mixture of fibrous or like friction material, friction-affecting or controlling material or materials, and a bond. The fibrous or like friction material used for this purpose may be any of a wide variety of friction materials but usually asbestos is utilized. In those instances where the composition body 10 is cured in the presence of heat and in the absence of pressure, a vegetable drying oil such as purely polymerized but not otherwise changed linseed oil may advantageously be used as the bond thereof. However, it is to be understood that any of a wide variety of other bonding materials may be employed, as well as combinations of such materials as, for example, an effective bond is afforded by an oil modified phenol aldehyde resin. In any event a bonding material is chosen which will impart the required strength to the friction elements.

Although it will be appreciated that any of a wide variety of materials may be used in compounding the body 10 of a friction element embodying our invention, the following is a typical formula which may be followed:

| | Parts by weight |
|---|---|
| Asbestos | 65 |
| Pulverized pyrobituminous material | 20 |
| Purely polymerized and not otherwise chemically changed linseed oil | 15 |
| Sulphur | 3 |
| Solvent | 7 |
| Total | 110 |

The solvent specified in the foregoing formula may be a petroleum thinner, such as petroleum naphtha, having an end point which is not substantially greater than 400° F. The pyrobituminous material specified may be bitiminous coal.

In manufacturing friction elements under the foregoing formula the oil is dissolved in the solvent and thereafter the asbestos, pyrobituminous material and the sulphur are introduced and thoroughly intermixed so that the bond is evenly distributed throughout the mixture. The mixture may then be placed in the hopper of a suitable rolling machine such, for example, as that shown in the aforesaid Smith Patent No. 1,920,023. The mixture is fed from the hopper of such a machine to the bite between the forming rollers of the machine. At this same time a strip of the wire mesh backing is also fed into the bite of the forming rollers and therefore the composition material is packed into the interstices of the wire backing in such a manner that it extends through the interstices and clings to and about the individual wires of the backing. After passage from the forming rollers the composition material and the wire backing comprise a continuous strip and this strip may be cut into strips, for example, twenty-five feet in length, and rolled into coils, or it may be cut into smaller strips or pieces of such length as may be required or desired. Such coils or short strips are thereafter subjected to a curing operation and this may be done by passing the coils or strips through a continuous oven for a period of approximately eighteen hours while gradually increasing the temperatures therein from about 180° F. to about 325° F. In this way the bond is converted to a solid state, and in this regard the sulphur specified in the foregoing formula is included for the purpose of sulphurizing the oil during the cure of the bond and aids in the conversion thereof to a solid state.

It will be noted that wire mesh used as backing or reenforcement in friction elements manufactured in this manner, must be capable of withstanding the stresses to which it is subjected while passing between the forming rollers which are relatively high and, of course, the backing must be such as to impart the proper reenforcing characteristics and the like. Heretofore, in attempting to obtain these characteristics, and for the sake of economy iron wire mesh has been the principal material used for backing purposes, and this has been coated or galvanized with zinc.

However, zinc is somewhat brittle and it has been found that during the rolling of composition material and the wire backing, bits of zinc, or spelter, may break away from the backing and permeate the friction material. This is quite undesirable because the zinc or spelter is of a hard crystalline character and, when it is exposed on the wearing surface of the friction element, may cause scoring of, and thereby damage to, the brake drum or the like, against which the friction element operates.

In accordance with our invention, however, we provide a practical and novel backing which is well fitted for the use to which backing of this type is put, and which does not have a hard crystalline coating such as zinc. For this purpose we use an iron wire mesh as the base and coat the same with a lead alloy.

For general purpose use in friction elements used in the brake structures of automotive vehicles and the like, with which our invention is primarily concerned, we prefer to use long strips of 8 x 6 iron wire screen of width corresponding to the width desired of the friction elements. Before introducing such a backing embodying our invention into the rolling machine, where it is combined with the composition material in the manner heretofore set forth, for example, it is coated with a novel protective coating in the form of a lead alloy as will be presently explained and this may be done prior to or after a sheet of wire mesh is divided into strips of the width desired.

One satisfactory method of applying a protective metal coating to a wire mesh in accordance with this invention is to pass the wire mesh through a bath composed of a protective metal, such metal being heated to render it molten. Thereafter the wire mesh is drawn past or between wipers where the excess coating metal is removed. The hardness and other like properties of the coating metal which are desired in the wire mesh determine somewhat the temperature of the molten metal and, therefore, the heat treatment, if any, that the wire mesh receives as it passes through the bath. Such heat treatment, for example, may consist of maintaining the bath at a relatively high temperature and, to increase the hardness of the coating in such instances, the coated mesh may be rapidly cooled by quenching or the like.

Figure 2:
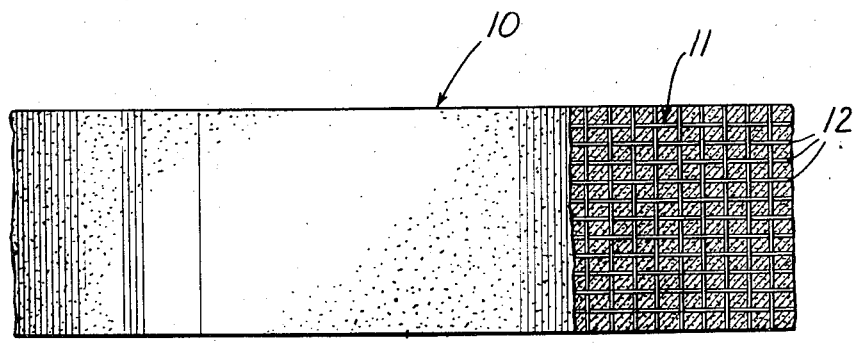
Fig. 2 is a plan view of the friction element shown in Fig. 1 and in which a part of the composition material is broken away to expose the wire backing.
Figure 3:
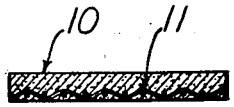
Fig. 3 is a transverse sectional view taken substantially on the line 3—3 of Fig. 1.
Figure 4:
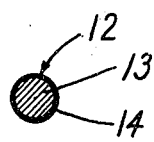
Fig. 4 is a detail sectional view of a coated wire embodying our invention.

We have found that lead alloys afford an excellent coating for wire backing such as the wire backing 11, Fig. 2. The lead itself is soft and when alloyed or otherwise compounded with a suitable hardness-imparting material, as will be presently explained, we have found that it affords a flexible, tough and tenacious surface coating which acts as an effective protection against corrosion of the wire and reenforces the wire to a considerable extent. Moreover, since the presence of lead is often beneficial in a friction element, the lead may spall off the wire and permeate the composition body of such an element with beneficial results.

The alloy which we prefer to use is composed of lead and antimony, a typical formula therefor being as follows:

|  | Percent by weight |
|---|---|
| Lead | 97 |
| Antimony | 3 |

While lead itself is inherently soft, by compounding a coating for iron wire backing according to the foregoing formula, the antimony is present in sufficient quantity to impart the hardness desirable in coatings on the wire backing of the usual friction element.

Although various processes may be used in coating wire mesh such as, for example, spraying hot metal thereonto, we prefer to use the dip process and to pass the wire mesh through a bath of the molten coating metal. In this process, using the above formula for the alloy bath, the bath should be kept at a temperature of from about 325° C. to 350° C., which is well above the melting point of the alloy which is about 315° C.

After passing through a bath such as the foregoing and wipers, as above described, the coated wire mesh, in the usual process, passes into drying rooms or compartments maintained at approximately room temperature, that is, for example, about 20° C. This change in temperature is usually sufficient to impart the proper hardness to the coating for general purpose use, inasmuch as it affords a tenacious coating which is sufficiently flexible to permit flexing of the wire but is also sufficiently hard for good rolling characteristics and to properly reenforce the joints between the wires. However, if a greater or lesser degree of hardness is desired in the coating this may be controlled within certain limits by varying the treatment. For example, if it is desired to produce a somewhat softer coating with the alloy prepared in accordance with the foregoing formula, this may be effected by passing the coated reenforcing wire mesh from the bath and wipers into a heated compartment where the cooling may be controlled and more gradually effected. If, on the other hand, a greater degree of hardness is desired with this alloy, this may be accomplished by more rapid cooling of the coated wire mesh as, for example, by quenching it in a liquid bath.

The lead-antimony alloy compounded in accordance with the foregoing formula and treated as above described has a Brinell hardness number of approximately 5.3. When it is used as a coating on 8 x 6 ferrous wire mesh, as heretofore referred to, it produces a coated wire mesh cloth wherein the base metal thereof is effectively protected by a tough flexible coating which has an ultimate tensile strength of approximately five thousand pounds per square inch. Therefore, a wire mesh coated in this manner is well suited for use as the wire backing in friction elements.

Other relative proportions of lead and antimony than those shown in the foregoing formula may be used, of course, to provide the relatively soft, flexible essentially lead alloy which may be used for coating wire backing, in the practice of the present invention. It is known that binary alloys of lead and antimony, which are predominantly lead, but contain up to above twelve percent antimony and eighty-eight percent lead possess corrosion resistance. However, for practical reasons lead-antimony alloys containing as much as about twelve percent antimony and about eighty-eight percent lead are not usually satisfactory as a coating on the wire backing of friction elements, in the practice of the present invention, since such alloys, by reason of their relatively high antimony content, are usually too hard and are uneconomical. Likewise, we consider binary lead-antimony alloys in which the antimony is present in quantities less than about one percent, by weight, as being too soft for practical use as a coating for wire backing in friction elements, in the practice of the present invention. Hence, it will be seen that we prefer to use binary lead-antimony alloys falling within the rather critical range of from approximately one percent antimony and approximately ninety-nine percent lead, to about twelve percent antimony and about eighty-eight percent lead, and for general purpose use in coating 8 x 6 wire mesh cloth for use as wire backing in the usual friction element the binary lead-antimony alloys which we prefer to use are within the optimum range of from approximately two percent antimony and ninety-eight percent lead to approximately five percent antimony and ninety-five percent lead, by weight.

From the foregoing description and the accompanying drawing, it will be noted that we have provided a novel and practical friction element employing a reenforcing wire backing which is coated with a tough but flexible alloy composed essentially and predominantly of lead but containing a minor proportion of antimony to impart a predetermined degree of hardness to the resulting essentially lead alloy.

Also, it will be noted that the present invention accomplishes its intended objects, including those which have been specifically referred to hereinbefore, and others of which are either inherent in the invention or will be apparent from the foregoing description considered in conjunction with the accompanying drawing.

While we have illustrated and described selected embodiments of our invention, it is to be understood that these are capable of variation and modification and we therefore do not wish to be limited to the precise details set forth, but desire to avail ourselves of such changes and alterations as fall within the purview of the following claims:

We claim:

1. A friction element comprising a composition body containing friction material, a bonding agent, and a flexible reenforcing wire backing having a tough but flexible metallic surface coating composed essentially of lead together with a metallic hardening agent.

2. A friction element comprising a composition body containing friction material, a bonding agent, and a flexible reenforcing wire backing having a tough but flexible metallic surface coating composed of a lead-antimony alloy.

3. A friction element comprising a composition body containing friction material, a bonding agent, and a flexible reenforcing wire backing substantially embedded in said composition body and having a tough but flexible surface coating of a lead-antimony alloy.

4. A friction element as defined in claim 1 in which the surface coating on said wire backing is a binary lead-antimony alloy composed essentially of lead but containing a minor proportion of antimony.

5. A friction element comprising a composition body containing friction material, a bonding agent, and a relatively soft, flexible iron mesh wire reenforcing backing substanally embedded in said composition body and composed of intersecting wires each having thereon a surface coating of a metallic alloy composed essentially of lead together with a minor proportion of another metal imparting a predetermined degree of hardness to the resulting alloy.

6. A friction element as defined in claim 5 in which the intersecting wires in said wire mesh backing are joined at their points of intersection by said lead-containing alloy.

7. A friction element as defined in claim 2 in which the lead and antimony are present in said surface coating within a range of from about ninety-nine percent lead and about one percent antimony to about eighty-eight percent lead and about twelve percent antimony, by weight.

8. A friction element as defined in claim 2 in which the lead and antimony are present in said surface coating within a range of from about ninety-eigth percent lead and about two percent antimony to about ninety-five percent lead and about five percent antimony, by weight.

9. A friction element as defined in claim 2 in which the reenforcing wire backing is composed of relatively soft flexible iron wire of relatively light gauge.

WILLIAM A. BLUME.
EDWARD W. CONARTON.